United States Patent
Miwa

(10) Patent No.: US 10,331,538 B2
(45) Date of Patent: Jun. 25, 2019

(54) INFORMATION PROCESSING APPARATUS AND PROGRAM EXECUTION STATUS DISPLAY METHOD

(71) Applicant: FUJITSU LIMITED, Kawasaki-shi, Kanagawa (JP)

(72) Inventor: Masahiro Miwa, Kawaguchi (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 15/607,711

(22) Filed: May 30, 2017

(65) Prior Publication Data

US 2018/0004621 A1 Jan. 4, 2018

(30) Foreign Application Priority Data

Jul. 1, 2016 (JP) .................................. 2016-131474

(51) Int. Cl.
*G06F 11/34* (2006.01)

(52) U.S. Cl.
CPC ...... *G06F 11/3419* (2013.01); *G06F 2201/88* (2013.01)

(58) Field of Classification Search
CPC ............. G06F 11/3419; G06F 11/3062; G06F 2201/88; G05B 23/024
See application file for complete search history.

(56) References Cited

U.S. PATENT DOCUMENTS

| | | | |
|---|---|---|---|
| 2014/0259011 A1* | 9/2014 | Tashiro | G06F 9/45558 718/1 |
| 2016/0357656 A1* | 12/2016 | Yamamoto | G06F 11/3495 |
| 2017/0199761 A1* | 7/2017 | Yamamoto | G06F 9/45558 |

FOREIGN PATENT DOCUMENTS

| | | |
|---|---|---|
| JP | 2000-250780 | 9/2000 |
| JP | 2005-242559 | 9/2005 |
| JP | 2014-106679 | 6/2014 |

\* cited by examiner

*Primary Examiner* — Bryan Bui
(74) *Attorney, Agent, or Firm* — Fujitsu Patent Center

(57) ABSTRACT

An information processing apparatus obtains start time information indicating a plurality of start times that are calculated when a target program is executed. The target program includes a loop that repeats a process using a plurality of functions. The information processing apparatus obtains a plurality of sampling logs that are generated by intermittent sampling. The information processing apparatus converts each sampling time into a time difference from the immediately preceding start time. The information processing apparatus classifies the plurality of sampling logs into a plurality of time difference segments, and counts, for each of the time difference segments, the number of times execution of each of the plurality of functions is detected. The information processing apparatus displays time-series information indicating a corresponding relationship between the plurality of time difference segments and the functions that are executed, based on the counted number of times.

6 Claims, 19 Drawing Sheets

TARGET PROGRAM         133

```
...

int main(void) {
    // start time buffer (inserted)
    std::vector<unsigned long long> buffer;
    // Record process ID (inserted)
    buffer.push_back(getpid());

// loop
    for(int i=1; i<17; i++) {
        // Record start time (inserted)
        buffer.push_back(rdtsc());
        a();
        b();
        c();
        d();
    }

// Output from buffer to file (inserted)
    FILE* outfile = fopen("sample.txt", "w");
    for(int i=0; i<buffer.size(); i++) {
        fprintf(outfile, "%d\n", buffer[i]);
    }
    fclose(outfile);
    return 0;
}

// function a
void a(void) { ... return; }
// function b
void b(void) { ... return; }
// function c
void c(void) { ... return; }
// function d
void d(void) { ... return; }
```

FIG. 9

SAMPLING TABLE

| PROCESS ID | TIME STAMP | INSTRUCTION ADDRESS |
|---|---|---|
| A | 15 | 0x001312a9 |
| A | 33 | 0x00009d00 |
| A | 51 | 0x00003121 |
| A | 69 | 0x00158991 |
| A | 87 | 0x00148b9c |
| A | 105 | 0x001312a9 |
| A | 123 | 0x00009daa |
| A | 141 | 0x00003121 |
| A | 159 | 0x0013df13 |

START TIME TABLE

| PROCESS ID | A  | 136 |
|------------|----|-----|
| TIME STAMP | 10 |     |
|            | 20 |     |
|            | 30 |     |
|            | 40 |     |
|            | 50 |     |
|            | 60 |     |
|            | 70 |     |
|            | 80 |     |
|            | 90 |     |
|            | 100|     |
|            | 110|     |
|            | 120|     |
|            | 130|     |
|            | 140|     |
|            | 150|     |
|            | 160|     |

FIG. 11

FUNCTION DETERMINATION TABLE  ⎽135

| PROGRAM ID | FUNCTION NAME | ADDRESS RANGE |
|---|---|---|
| A | a | 0x00003000-0x00007fff |
| A | b | 0x00008000-0x00012fff |
| A | c | 0x00130000-0x00155fff |
| A | d | 0x00156000-0x00159fff |

FIG. 12

LOOP EXECUTION TABLE 138

| PROCESS ID | TIME OFFSET | FUNCTION NAME |
|---|---|---|
| A | 1 | a |
| A | 1 | a |
| A | 3 | b |
| A | 3 | b |
| A | 5 | c |
| A | 5 | c |
| A | 7 | c |
| A | 9 | c |
| A | 9 | d |

FIG. 13

VISUALIZATION TABLE

139

| PROCESS ID | OFFSET SEGMENT | FUNCTION RATE |
|---|---|---|
| A | greater than or equal to 0 and less than 2 | a: 100% |
| A | greater than or equal to 2 and less than 4 | b: 100% |
| A | greater than or equal to 4 and less than 6 | c: 100% |
| A | greater than or equal to 6 and less than 8 | c: 100% |
| A | greater than or equal to 8 and less than 10 | c: 50%, d: 50% |

FIG. 14

INFORMATION PROCESSING APPARATUS AND PROGRAM EXECUTION STATUS DISPLAY METHOD

CROSS-REFERENCE TO RELATED APPLICATION

This application is based upon and claims the benefit of priority of the prior Japanese Patent Application No. 2016-131474, filed on Jul. 1, 2016, the entire contents of which are incorporated herein by reference.

FIELD

The embodiments discussed herein are related to an information processing apparatus and a program execution status display method.

BACKGROUND

The behavior of an application program is often analyzed based on sampling logs that are collected by causing a processor to generate intermittent interrupts during execution of the application program. For example, in some cases, a processor having a function of generating interrupts at regular intervals executes an application program, and collects status information, such as the instruction address of an instruction that is being executed and the like, as a sampling log each time an interrupt is generated.

This method of analyzing the behavior of an application program is often called "profiling using time-based sampling". With the "profiling using time-based sampling", it is possible to figure out the execution order of program modules and the time taken for execution, by arranging collected sampling logs in time series, for example.

As an example of such a technique, there has been proposed an analysis apparatus that analyzes the call status of functions contained in an application program. The proposed analysis apparatus causes the processor to generate an interrupt at predetermined intervals during execution of an application program. Each time an interrupt is generated, the analysis apparatus collects a function call record including the address of a function that is being called, from the stack area of the memory. The analysis apparatus displays time-series information indicating when each function is called, based on the collected function call records. Further, the analysis apparatus counts and displays the number of times each function is called, based on the collected function call records.

See, for example, Japanese Laid-open Patent Publication No. 2000-250780.

If sampling logs are collected at shorter intervals, it is possible to analyze the behavior of an application program in greater detail. However, it is sometimes difficult to reduce the length of the sampling interval due to limitations of computational resources. Further, if the sampling interval is too short, the behavior of the application program is likely to be different from the original behavior due to the load of sampling itself. Therefore, in many cases, sampling logs are collected at sufficient intervals.

However, even if intermittent sampling logs are arranged in order of time of sampling, useful analysis results are not likely to be obtained for the loop contained in the application program. This is because the repetition interval of loop processing is highly likely to be shifted from the sampling interval, and each of the sampling logs collected during execution of the loop merely indicates an arbitrary one of the instructions that are executed in the loop.

For example, consider an application program that sequentially calls functions f1, f2, and f3 in a loop. When a process inside the loop iterates, the functions f1, f2, and f3 are repeatedly called. If sampling logs are intermittently collected during execution of the loop, there may be a case where the function f1 is being executed at the first sampling time; the function f3 is being executed at the second sampling time; the function f2 is being executed at the third sampling time; and the function f2 is being executed at the fourth sampling time. However, the analysis result in which the functions that are being executed are arranged in order of sampling time, that is, in order of f1, f3, f2, f2 and so on does not represent either the order in which the functions are called in the loop, or the time taken to execute the functions f1, f2, and f3.

SUMMARY

According to one aspect, there is provided an information processing apparatus including: a memory configured to store: start time information indicating a plurality of start times that are calculated when a target program is executed, the target program including a loop that repeats a process using a plurality of functions, each of the start times indicating a time when execution of the process is started on each repetition of the process, and a plurality of sampling logs that are generated by intermittent sampling when the target program is executed, each of the sampling logs including a sampling time and status information used for specifying a function being executed from among the plurality of functions; and a processor configured to perform a procedure including: converting the sampling time of each of the plurality of sampling logs into a time difference from the start time immediately preceding the sampling time, among the plurality of start times, classifying the plurality of sampling logs into a plurality of time difference segments based on the time difference, and counting, for each of the time difference segments, a number of times execution of each of the plurality of functions is detected, based on the status information of the sampling log belonging to the time difference segment, and displaying time-series information indicating a corresponding relationship between the plurality of time difference segments that are arranged in order of time difference and the functions that are executed, based on the counted number of times.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of editing a target program;

FIG. 10 illustrates an example of a sampling table;

FIG. 11 illustrates an example of a start time table;

FIG. 12 illustrates an example of a function determination table;

FIG. 13 illustrates an example of a loop execution table;

FIG. 14 illustrates an example of a visualization table;

DESCRIPTION OF EMBODIMENTS

Figure 1:
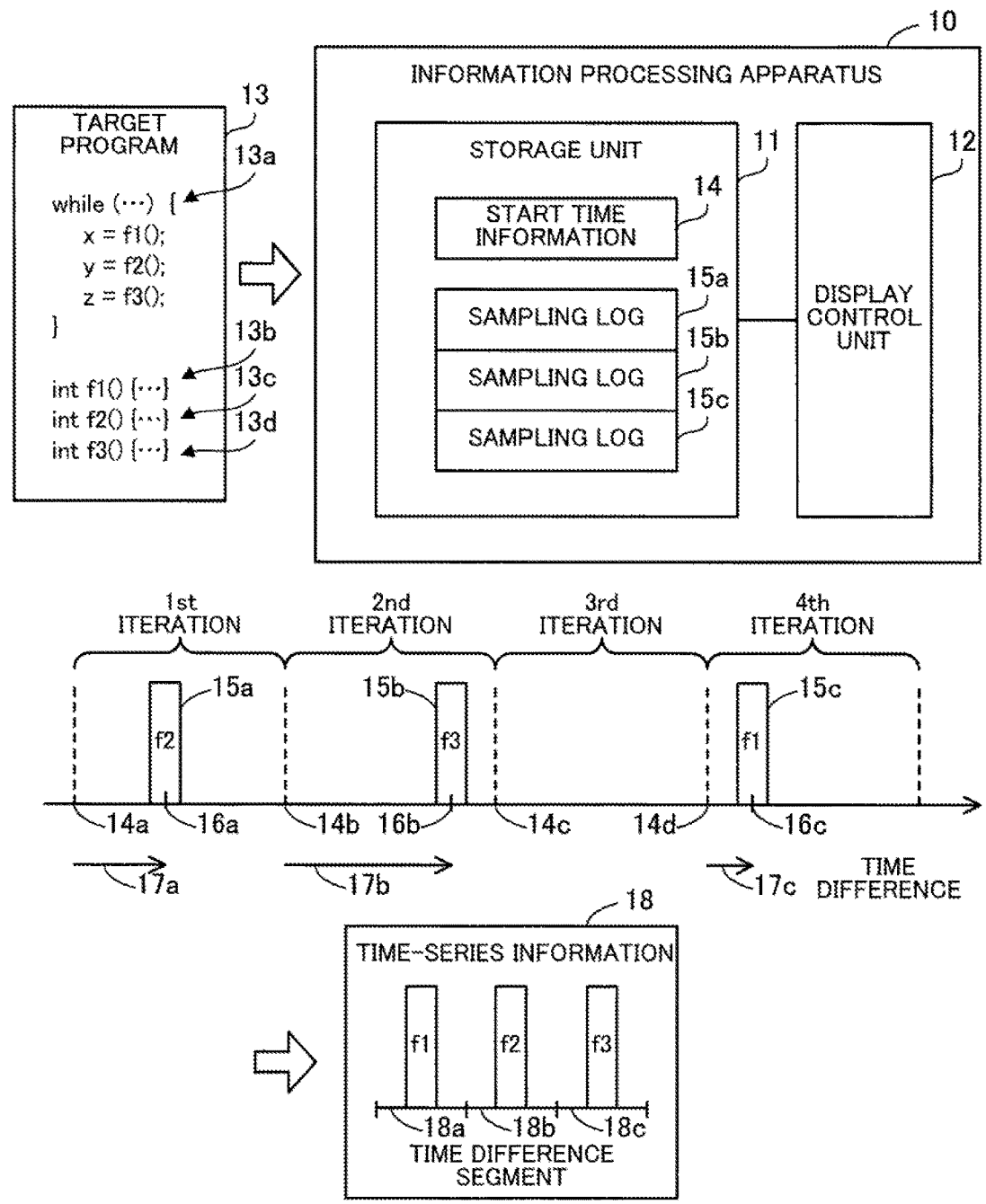
FIG. 1 illustrates an example of an information processing apparatus according to a first embodiment.

Several embodiments will be described below with reference to the accompanying drawings, wherein like reference numerals refer to like elements throughout.

(a) First Embodiment

Hereinafter, a first embodiment will be described.

FIG. 1 illustrates an example of an information processing apparatus 10 according to a first embodiment.

The information processing apparatus 10 of the first embodiment analyzes the behavior of a target program 13. The information processing apparatus 10 is used for debugging, operating, and maintaining the target program 13, for example. The information processing apparatus 10 may be a client computer that is operated by the user, or may be a server computer that is accessed by a client computer.

The information processing apparatus 10 includes a storage unit 11 and a display control unit 12. The storage unit 11 may be a volatile semiconductor memory such as a random access memory (RAM) and the like, or may be a non-volatile storage device such as a hard disk drive (HDD), a flash memory, and the like. The display control unit 12 may be a processor such as a central processing unit (CPU), a digital signal processor (DSP), and the like. Further, the display control unit 12 may include an application specific electronic circuit such as an application specific integrated circuit (ASIC), a field programmable gate array (FPGA), and the like. The processor executes programs stored in a memory such as a RAM and the like (or the storage unit 11). The programs executed by the processor include a program execution status display program describing processing that will be described below. A set of multiple processors may be referred to as a "multiprocessor" or simply as a "processor".

The storage unit 11 stores start time information 14, and a plurality of sampling logs including sampling logs 15a, 15b, and 15c. The start time information 14 and the plurality of sampling logs are generated when the target program 13 is executed.

The target program 13 is a program that is analyzed. The target program 13 may be human-readable source code, or may be machine-readable object code. The target program 13 includes a loop 13a. The loop 13a repeats an in-loop process using a plurality of functions including functions 13b (f1), 13c (f2), and 13d (f3). The term "function" as used herein may be any unit of processing in a program that may be called by other units of processing. A "function" is often referred to by other names such as "method", "procedure", "section", and so on. When a predetermined loop condition is satisfied, the in-loop process may be repeated two or more times. The functions 13b, 13c, and 13d may be included in the target program 13. For example, in each in-loop process, these three functions 13b, 13c, and 13d are called in this order. Note that the target program 13 may be stored in the storage unit 11.

The start time information 14 indicates a plurality of start times that are calculated when the target program 13 is executed. Each of the plurality of start times indicates the time when execution of the in-loop process is started on each repetition of the in-loop process. For example, the start time information 14 indicates start times 14a, 14b, 14c, and 14d. The start time 14a indicates the time when the first iteration of the in-loop process is started; the start time 14b indicates the time when the second iteration of the in-loop process is started; the start time 14c indicates the time when the third iteration of the in-loop process is started; and the start time 14d indicates the time when the fourth iteration of the in-loop process is started.

The start time information 14 may be generated by the information processing apparatus 10, or may be generated by another information processing apparatus. The display control unit 12 may generate the start time information 14, by starting the target program 13 with an instruction inserted therein for outputting the start time of the in-loop process each time the in-loop process is repeated. For example, in the case where the functions 13b, 13c, and 13d are sequentially called in the loop 13a, an instruction is inserted before a call for the function 13b, such as at the top of the loop 13a or the like. Insertion of an instruction may be performed by the user by editing the target program 13. Further, insertion of an instruction may be assisted by use of a tool such as a compiler and the like. Alternatively, insertion of an instruction may be automatically performed by an analysis tool. Insertion of an instruction may be performed on source code, or may be performed on object code.

The plurality of sampling logs including the sampling log 15a, 15b, and 15c are logs generated by intermittent sampling when the target program 13 is executed. For example, a sampling log is periodically generated at predetermined time intervals during execution of the target program 13. Each sampling log includes a sampling time at which the sampling log is generated, and status information used for specifying a function being executed at the sampling time. The status information includes, for example, an instruction address of an instruction being executed. The start time and the sampling time may be measured by a real-time clock managed by an operating system (OS). Alternatively, the start time and the sampling time may be measured by a counter (such as a clock counter or the like) included in a processor that executes the target program 13.

The plurality of sampling logs may be generated by the information processing apparatus 10, or may be generated by another information processing apparatus. The display control unit 12 may start the target program 13, and perform intermittent sampling during execution of the target program 13.

For example, the sampling log 15a includes a sampling time 16a and status information indicating the function 13c, for example. The sampling log 15a is generated during the first iteration of the in-loop process. The sampling log 15b includes a sampling time 16b and status information indicating the function 13d. The sampling log 15b is generated during the second iteration of the in-loop process. The sampling log 15c includes a sampling time 16c and status information indicating the function 13d. The sampling log 15c is generated during the fourth iteration of the in-loop process.

The display control unit 12 analyzes the behavior of the target program 13 and displays the analysis result. A display for displaying the analysis result may be included in the information processing apparatus 10, may be directly connected to the information processing apparatus 10, or may be included in another information processing apparatus communicable with the information processing apparatus 10. In the case of displaying the analysis result on a display included in another information processing apparatus, the display control unit 12 transmits the analysis result data via a network.

The display control unit 12 obtains the start time information 14 and the plurality of sampling logs. The display control unit 12 converts the sampling time of each of the plurality of sampling logs into a time difference from the start time immediately preceding that sampling time, among the plurality of start times indicated by the start time information 14. If the N-th iteration (N is an integer greater than or equal to 1) of the in-loop process is being executed at a given sampling time, the sampling time is converted into an offset from the start time of the N-th iteration of the in-loop process.

For example, the display control unit 12 calculates, for the sampling log 15a, the difference between the sampling time 16a and its immediately preceding start time 14a (the start time of the first iteration of the in-loop process) as a time difference 17a. The display control unit 12 also calculates, for the sampling log 15b, the difference between the sampling time 16b and its immediately preceding start time 14b (the start time of the second iteration of the in-loop process) as a time difference 17b. The display control unit 12 also calculates, for the sampling log 15c, the difference between the sampling time 16c and its immediately preceding start time 14d (the start time of the fourth iteration of the in-loop process) as a time difference 17c.

The display control unit 12 classifies the plurality of sampling logs into a plurality of time difference segments, based on the calculated time differences. The plurality of time difference segments are obtained by dividing a continuous time difference (time axis) into a plurality of segments. For example, the plurality of time difference segments have a predetermined time width. For classifying the time differences, the display control unit 12 may sort the plurality of sampling logs in ascending order of time difference. It is assumed here that the time difference 17a is greater than the time difference 17c, and the time difference 17b is further greater than the time difference 17a. In this case, the display control unit 12 sorts the sampling logs 15a, 15b, and 15c in ascending order of the time differences 17a, 17b, and 17c, so that the sampling log 15c, the sampling log 15a, and the sampling log 15b are arranged in this order.

For example, the plurality of time difference segments include time difference segments 18a, 18b, and 18c. The time difference segment 18a is a segment including the time difference=0. The time difference segment 18b is a segment that follows the time difference segment 18a on the time axis. The time difference segment 18c is a segment that follows the time difference segment 18b on the time axis. If the time difference 17a belongs to the time difference segment 18b, the display control unit 12 classifies the sampling log 15a into the time difference segment 18b. If the time difference 17b belongs to the time difference segment 18c, the display control unit 12 classifies the sampling log 15b into the time difference segment 18c. If the time difference 17c belongs to the time difference segment 18a, the display control unit 12 classifies the sampling log 15c into the time difference segment 18a.

The display control unit 12 counts, for each of the plurality of time difference segments, the number of times execution of each function is detected, based on the status information of the sampling log belonging to that time difference segment. If the status information includes the instruction address of an instruction that is being executed, the display control unit 12 may refer to function information indicating the corresponding relationship between instruction addresses and functions to determine the function that is being executed. The corresponding relationship between instruction addresses and functions may be created by the user, or may be generated by the information processing apparatus 10 or another information processing apparatus by analyzing the target program 13.

The display control unit 12 displays time-series information 18 indicating the corresponding relationship between the plurality of time difference segments that are arranged in order of time difference and the functions 13b, 13c, and 13d that are executed, based on the counted number of times. Preferably, the plurality of time difference segments are arranged in ascending order of time difference, and the execution status of the functions 13b, 13c, and 13d in the plurality of time difference segments are displayed in time series. For example, the display control unit 12 calculates, for each of the plurality of time difference segments, the execution rates of the functions 13b, 13c, and 13d, based on the counted number of times. Then, the display control unit 12 displays the time-series information 18 indicating the changes in the execution rates of the functions 13b, 13c, and 13d.

For example, assume that: all the sampling logs belonging to the time difference segment 18a indicate execution of the function 13b; all the sampling logs belonging to the time difference segment 18b indicate execution of the function 13c; and all the sampling logs belonging to the time difference segment 18c indicate execution of the function 13d. In this case, for example, time-series information 18 is displayed that indicates the execution rate of the function 13b is 100% in the time difference segment 18a; the execution rate of the function 13c is 100% in the time difference segment 18b; and the execution rate of the function 13d is 100% in the time difference segment 18c. This indicates that each in-loop process of the loop 13a, the functions 13b, 13c, and 13d are executed in order of the function 13b, the function 13c, and the function 13d.

According to the information processing apparatus 10 of the first embodiment, the start time information 14 indicating start times of iterations of the in-loop process, and the sampling logs 15a, 15b, and 15c generated during execution of the target program 13 are obtained. Based on the start time information 14, the sampling times 16a, 16b, and 16c are converted into the time differences 17a, 17b, and 17c, and each of the sampling logs 15a, 15b, and 15c is classified into one of the time difference segments 18a, 18b, and 18c. Then, the time-series information 18 indicating the corresponding relationship between the time difference segments 18a, 18b, and 18c and the executed functions 13b, 13c, and 13d is displayed.

Thus, it is possible to more appropriately express the time-series properties, such as the order in which the functions 13b, 13c, and 13d are called in the loop 13a, compared to the case where the sampling logs 15a, 15b, 15c are displayed in order of the sampling times 16a, 16b, and 16c.

Further, since each of the sampling logs 15a, 15b, and 15c is classified into one of the time difference segments 18a, 18b, and 18c, it is possible to obtain the effect equivalent to that of the case where the status information of a single in-loop process is sampled at short sampling intervals. Accordingly, even if the sampling interval is long, it is easy to analyze the in-loop process. Further, it is possible to save the calculation resources such as memories by increasing the length of the sampling interval. Furthermore, the behavior of the target program 13 is less affected by the sampling, so that the accuracy in measuring the behavior of the target program 13 is improved.

(b) Second Embodiment

Next, a second embodiment will be described.

Figure 2:
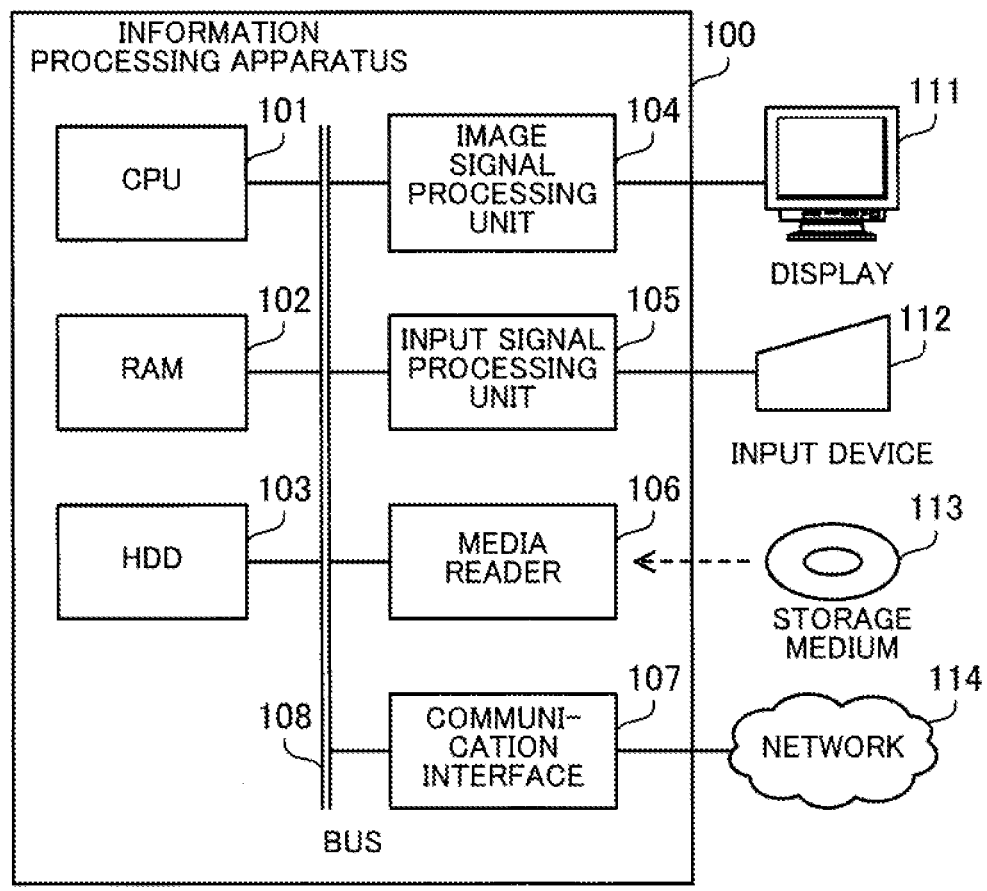
FIG. 2 is a block diagram illustrating an example of hardware of an information processing apparatus.

FIG. 2 is a block diagram illustrating an example of hardware of an information processing apparatus 100.

The information processing apparatus 100 according to the second embodiment includes a CPU 101, a RAM 102, an HDD 103, an image signal processing unit 104, an input signal processing unit 105, a media reader 106, and a communication interface 107. These components of the information processing apparatus 100 are connected to a bus 108. The information processing apparatus 100 corresponds to the information processing apparatus 10 of the first embodiment. The CPU 101 corresponds to the display control unit 12 of the first embodiment. The RAM 102 or the HDD 103 corresponds to the storage unit 11 of the first embodiment. The information processing apparatus 100 may be a client computer, or may be a server computer.

The CPU 101 is a processor including an arithmetic circuit that executes program instructions. The CPU 101 loads at least part of a program and data stored in the HDD 103 to the RAM 102, and executes the program. Note that the CPU 101 may include multiple processor cores, and the information processing apparatus 100 may include multiple processors. Processes described below may be executed in parallel by using multiple processors or processor cores. A set of multiple processors (a multiprocessor) may be referred to as a "processor".

The RAM 102 is a volatile semiconductor memory that temporarily stores a program executed by the CPU 101 and data used for operations by the CPU 101. The information processing apparatus 100 may include other types of memories than a RAM, and may include a plurality of memories.

The HDD 103 is a non-volatile storage device that stores software programs (such as an OS, middleware, application software, and the like) and data. The programs include a program execution status display program. The information processing apparatus 100 may include other types of storage devices such as a flash memory, an SSD, and the like, and may include a plurality of non-volatile storage devices.

The image signal processing unit 104 outputs an image to a display 111 connected to the information processing apparatus 100, in accordance with an instruction from the CPU 101. The display 111 may be any type of display, such as a cathode ray tube (CRT) display, a liquid crystal display (LCD), a plasma display, an organic electro-luminescence (OEL) display, and the like.

The input signal processing unit 105 obtains an input signal from an input device 112 connected to the information processing apparatus 100, and outputs the input signal to the CPU 101. Examples of the input device 112 include a pointing device (such as a mouse, a touch panel, a touch pad, a trackball, and the like), a keyboard, a remote controller, a button switch, and the like. A plurality of types of input devices may be connected to the information processing apparatus 100.

The media reader 106 is a reading device that reads a program and data stored in a storage medium 113. Examples of the storage medium 113 include a magnetic disk, an optical disc, a magneto-optical disk (MO), a semiconductor memory, and the like. Examples of magnetic disks include a flexible disk (FD) and an HDD. Examples of optical discs include a compact disc (CD), a digital versatile disc (DVD), and the like.

The media reader 106 reads, for example, a program and data from the storage medium 113, and copies the read program and data to other recording media such as the RAM 102, the HDD 103, and so on. The read program is executed by, for example, the CPU 101. The storage medium 113 may be a portable storage medium, and may be used for distributing a program and data. Each of the storage medium 113 and the HDD 103 may be referred to as a computer-readable storage medium.

The communication interface 107 is an interface that is connected to a network 114 to communicate with other apparatuses via the network 114. The communication interface 107 may be a wired communication interface connected to a communication apparatus such as a switch via a cable, or may be a radio communication interface connected to a base station via a radio link.

Figure 3:
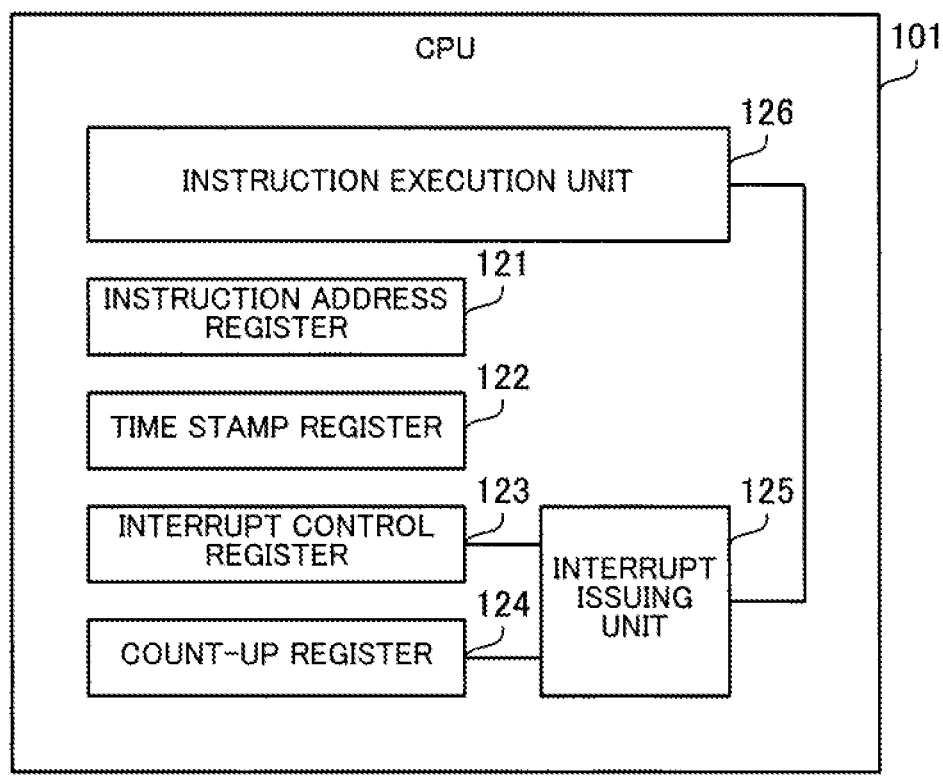
FIG. 3 is a block diagram illustrating an example of hardware of a CPU.

FIG. 3 is a block diagram illustrating an example of hardware of the CPU 101.

The CPU 101 includes an instruction address register 121, a time stamp register 122, an interrupt control register 123, a count-up register 124, an interrupt issuing unit 125, and an instruction execution unit 126. Note that FIG. 3 illustrates circuits related mainly to time-based sampling among various circuits included in the CPU 101.

The instruction address register 121 is a volatile storage circuit for storing an instruction address of an instruction being executed by the CPU 101. The time stamp register 122 is a volatile storage circuit for storing a time stamp of the time elapsed from when the CPU 101 is started. The time stamp is incremented by one each time a predetermined number of clocks are generated.

The interrupt control register 123 stores an interrupt generation flag indicating whether to generate regular interrupts. When the interrupt generation flag is ON (for example, "1"), this indicates that regular interrupts are generated. When the interrupt generation flag is OFF (for example, "0"), this indicates that regular interrupts are not generated. The interrupt generation flag may be written to the interrupt control register 123 by software.

The count-up register 124 is a volatile storage circuit for storing a count that is incremented starting with a specified initial value. The initial value of the count may be written to the count-up register 124 by software. The count is incremented by one each time a predetermined number of clocks are generated. There is an upper limit on the count that may be stored in the count-up register 124. If the count is incremented and exceeds the upper limit, an overflow occurs in the count-up register 124.

The interrupt issuing unit 125 issues an interrupt to the instruction execution unit 126 when the interrupt generation flag stored in the interrupt control register 123 is ON and an overflow occurs in the count-up register 124. By adjusting the initial value that is written to the count-up register 124 by software, it is possible to cause the interrupt issuing unit 125 to issue an interrupt at desired intervals. Note that the initial value is written to the count-up register 124 each time an overflow occurs.

The instruction execution unit 126 reads an instruction of a program from the RAM 102, and executes the instruction.

When the interrupt issuing unit 125 issues an interrupt, the instruction execution unit 126 suspends the currently running application program, and starts a predetermined interrupt handler program. When the interrupt handler program ends, the instruction execution unit 126 restarts the suspended application program.

The information processing apparatus 100 analyzes the behavior of a target program by "profiling by time-based sampling", using the functions of the CPU 101 described above. That is, the information processing apparatus 100 causes the CPU 101 to regularly generate an interrupt, and obtains a sampling record indicating the execution status of the target program when an interrupt is generated. The information processing apparatus 100 analyzes sampling records that are regularly obtained, and displays the analysis result on the display 111. In the second embodiment, the behavior of a loop included in the target program is mainly analyzed.

Hereinafter, visualization of a loop behavior will be described.

Figure 4:
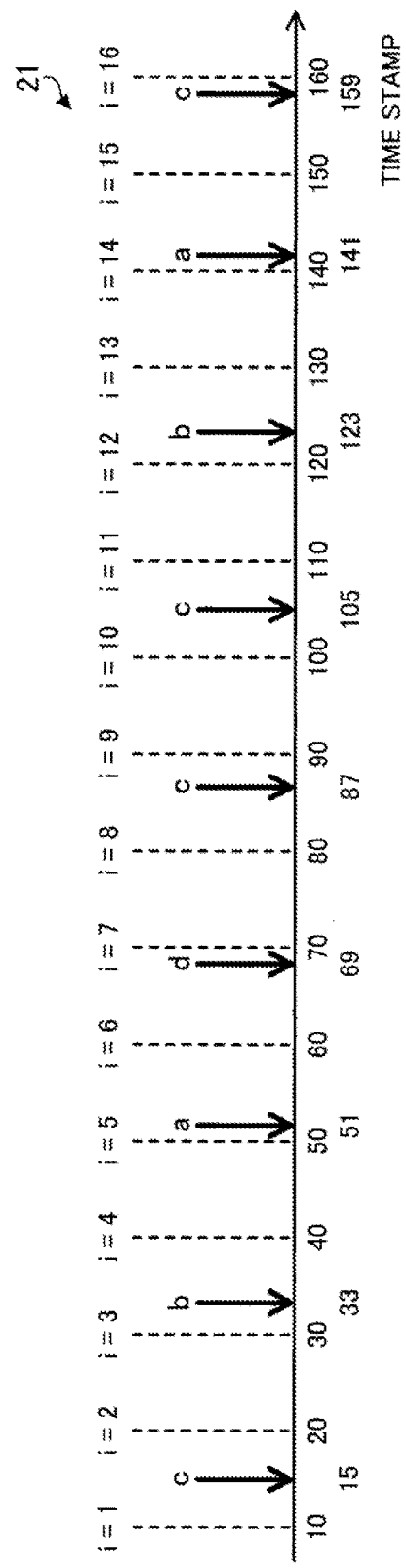
FIG. 4 illustrates a first example of visualization of sampling records.

FIG. 4 illustrates a first example of visualization of sampling records.

A graph 21 is a graph generated in the case where sampling records are arranged in ascending order of time stamp. The time stamp used for the graph 21 is the one that is stored in the time stamp register 122 of the CPU 101. It is assumed here that the in-loop process of a loop included in a target program iterates 16 or more times.

The period of the in-loop process is "10". The first iteration of the in-loop process (i=1) is started at time "10". The second iteration of the in-loop process (i=2) is started at time "0". The third iteration of the in-loop process (i=3) is started at time "30". The fourth iteration of the in-loop process (i=4) is started at time "40". The fifth iteration of the in-loop process (i=5) is started at time "50". The sixth iteration of the in-loop process (i=6) is started at time "0". The seventh iteration of the in-loop process (i=7) is started at time "70". The eighth iteration of the in-loop process (i=8) is started at time "80".

The ninth iteration of the in-loop process (i=9) is started at time "90". The tenth iteration of the in-loop process (i=10) is started at time "100". The eleventh iteration of the in-loop process (i=11) is started at time "110". The twelfth iteration of the in-loop process (i=12) is started at time "120". The thirteenth iteration of the in-loop process (i=13) is started at time "130". The fourteenth iteration of the in-loop process (i=14) is started at time "140". The fifteenth iteration of the in-loop process (i=15) is started at time "150". The sixteenth iteration of the in-loop process (i=16) is started at time "160".

Meanwhile, the sampling period is "18". The first sampling is performed at time "15". The second sampling is performed at time "33". The third sampling is performed at time "51". The fourth sampling is performed at time "69". The fifth sampling is performed at time "87". The sixth sampling is performed at time "105". The seventh sampling is performed at time "123". The eighth sampling is performed at time "141". The ninth sampling is performed at time "159".

The target program includes functions a, b, c, and d. The functions a, b, c, and d are called in the in-loop process. At time "15", the function c is executed. At time "33", the function b is executed. At time "51", the function a is executed. At time "69", the function d is executed. At time "87", the function c is executed. At time "105", the function c is executed. At time "123", the function b is executed. At time "141", the function a is executed. At time "159", the function c is executed.

However, even when the functions indicated by the sampling records are arranged in ascending order of sampling time as in the graph 21, it is difficult to understand the behavior of the in-loop process. A sequence of functions indicated in the graph 21, that is, the function c, the function b, the function a, the function d, the function c, the function c, the function b, the function a, and the function c, does not represent the order in which functions are called in the loop. In view of the above, the information processing apparatus 100 according to the second embodiment visualizes sampling records in a way different from that of the graph 21.

Figure 5:
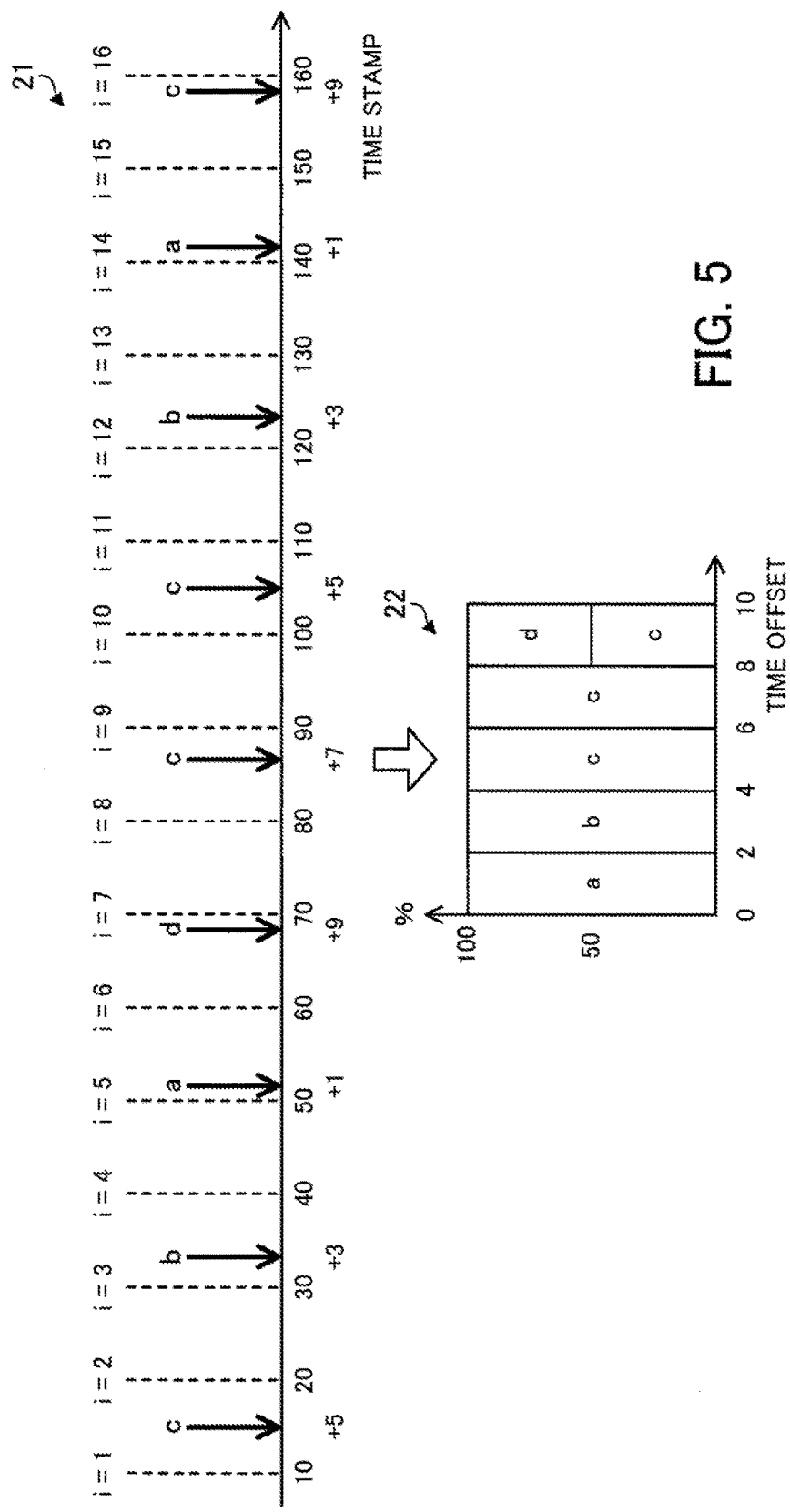
FIG. 5 illustrates a second example of visualization of sampling records.

FIG. 5 illustrates a second example of visualization of sampling records.

The information processing apparatus 100 converts a sampling time of each sampling record into a time offset from its immediately preceding start time. An immediately preceding start time of a sampling time is the start time of execution of the in-loop process that is being executed at the time of sampling. If the N-th iteration (N is an integer greater than or equal to 1) of the in-loop process is being executed at the time of sampling, a time offset is the difference between the sampling time and the start time of the N-th iteration of the in-loop process.

It is assumed here that the same sampling records as those of FIG. 4 are obtained. The sampling time "15" is converted into a time offset "5" from the immediately preceding start time "10". The sampling time "33" is converted into a time offset "3" from the immediately preceding start time "30". The sampling time "51" is converted into a time offset "1" from the immediately preceding start time "50". The sampling time "69" is converted into a time offset "9" from the immediately preceding start time "60". The sampling time "87" is converted into a time offset "7" from the immediately preceding start time "80".

The sampling time "105" is converted into a time offset "5" from the immediately preceding start time "100". The sampling time "123" is converted into a time offset "3" from the immediately preceding start time "120". The sampling time "141" is converted into a time offset "1" from the immediately preceding start time "140". The sampling time "159" is converted into a time offset "9" from the immediately preceding start time "150".

The information processing apparatus 100 sorts the sampling records in ascending order of time offset. Thus, the collected sampling records are arranged substantially in accordance with their relative positions from the top of the loop. The information processing apparatus 100 divides the time offset into a plurality of offset segments, and counts the number of times each of the functions a, b, c, and d is detected in each offset segments. Then, the information processing apparatus 100 displays a graph 22 on the display 111. The graph 22 is a stacked bar chart representing the detection rates of the functions a, b, c, and d in each offset segment.

It is assumed here that the time offset is divided into offset segments with a width of "2". The third and eighth sampling records are classified into the offset segment greater than or equal to 0 and less than 2. The second and seventh sampling records are classified into the offset segment greater than or equal to 2 and less than 4. The first and sixth sampling records are classified into the offset segment greater than or equal to 4 and less than 6. The fifth sampling record is classified into the offset segment greater than or equal to 6 and less than 8. The fourth and ninth sampling records are classified into the offset segment greater than or equal to 8 and less than 10.

That is, in the offset segment greater than or equal to 0 and less than 2, the function a is executed with a probability of 100%. In the offset segment greater than or equal to 2 and less than 4, the function b is executed with a probability of 100%. In the offset segment greater than or equal to 4 and less than 6, the function c is executed with a probability of 100%. In the offset segment greater than or equal to 6 and less than 8, the function c is executed with a probability of 100%. In the offset segment greater than or equal to 8 and less than 10, the function c is executed with a probability of 50%, and the function d is executed with a probability of 50%. With the graph 22, it is possible to estimate the order in which the functions a, b, c, and d are called in each in-loop process and the time needed to execute each of the functions a, b, c, and d.

The sampling interval may be set to, for example, around 50 milliseconds. Further, the width of the offset segment may be set to, for example, around 1 millisecond. As for loops that iterate many times, even with a long sampling interval, it is possible to obtain an analysis result substantially equivalent to that obtained with a shorter sampling interval.

Figure 6:
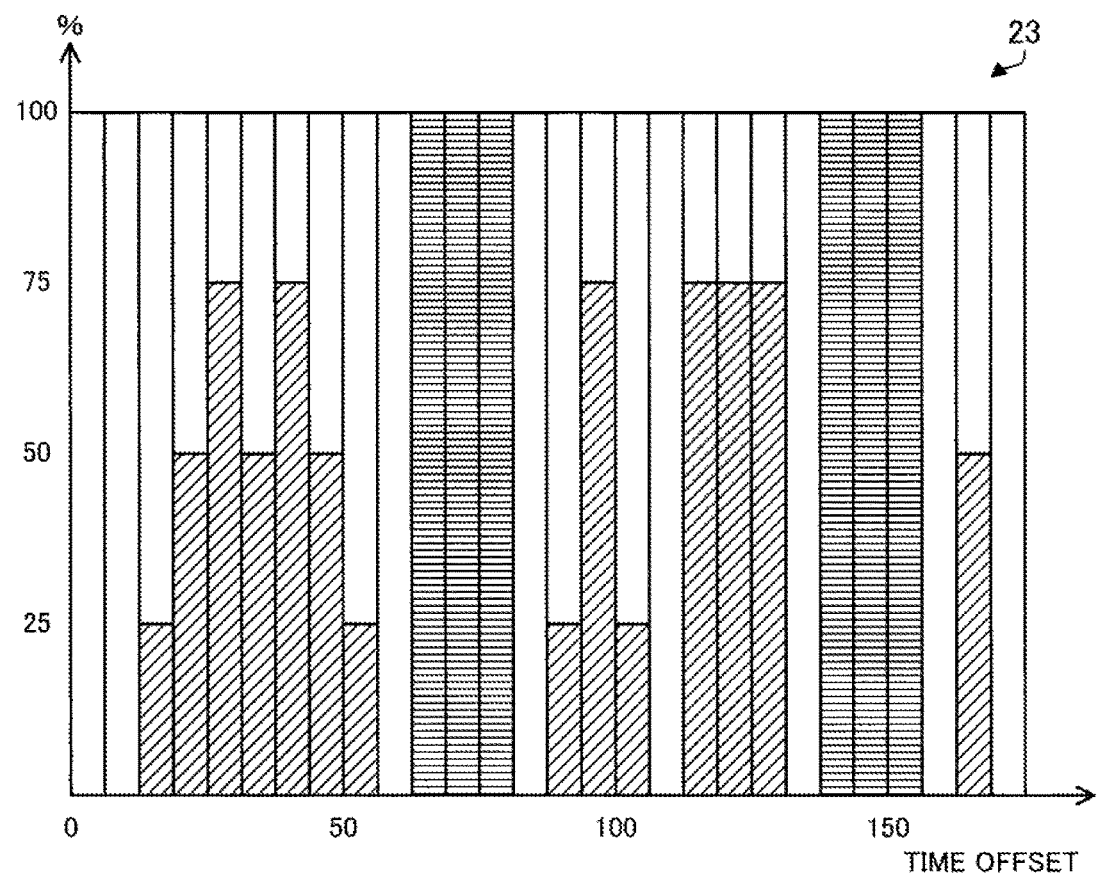
FIG. 6 illustrates a third example of visualization of sampling records.

FIG. 6 illustrates a third example of visualization of sampling records.

It is assumed here that sampling records different from those of FIGS. 4 and 5 are obtained, and a graph is generated based on the obtained sampling records using the method of FIG. 5. A graph 23 of FIG. 6 is generated based on the sampling records different from those of FIGS. 4 and 5.

Similar to the graph 22, the graph 23 is a stacked bar chart representing the detection rates of functions in each offset segment. In the example of FIG. 6, detection rates of three functions are represented in the graph 23. By increasing the number of iterations of a loop, it is possible to obtain time-series data of high accuracy. From the graph 23, the existence of an unexpected function call may be detected for example. If an unexpected function call is detected, the target program may be debugged so as not to generate that function call. Also, from the graph 23, a bottleneck function causing a processing delay may be detected, for example. If a bottle neck function is detected, the target program may be tuned to reduce the time needed to execute the bottleneck function.

Hereinafter, a description will be given of functions of the information processing apparatus 100.

Figure 7:
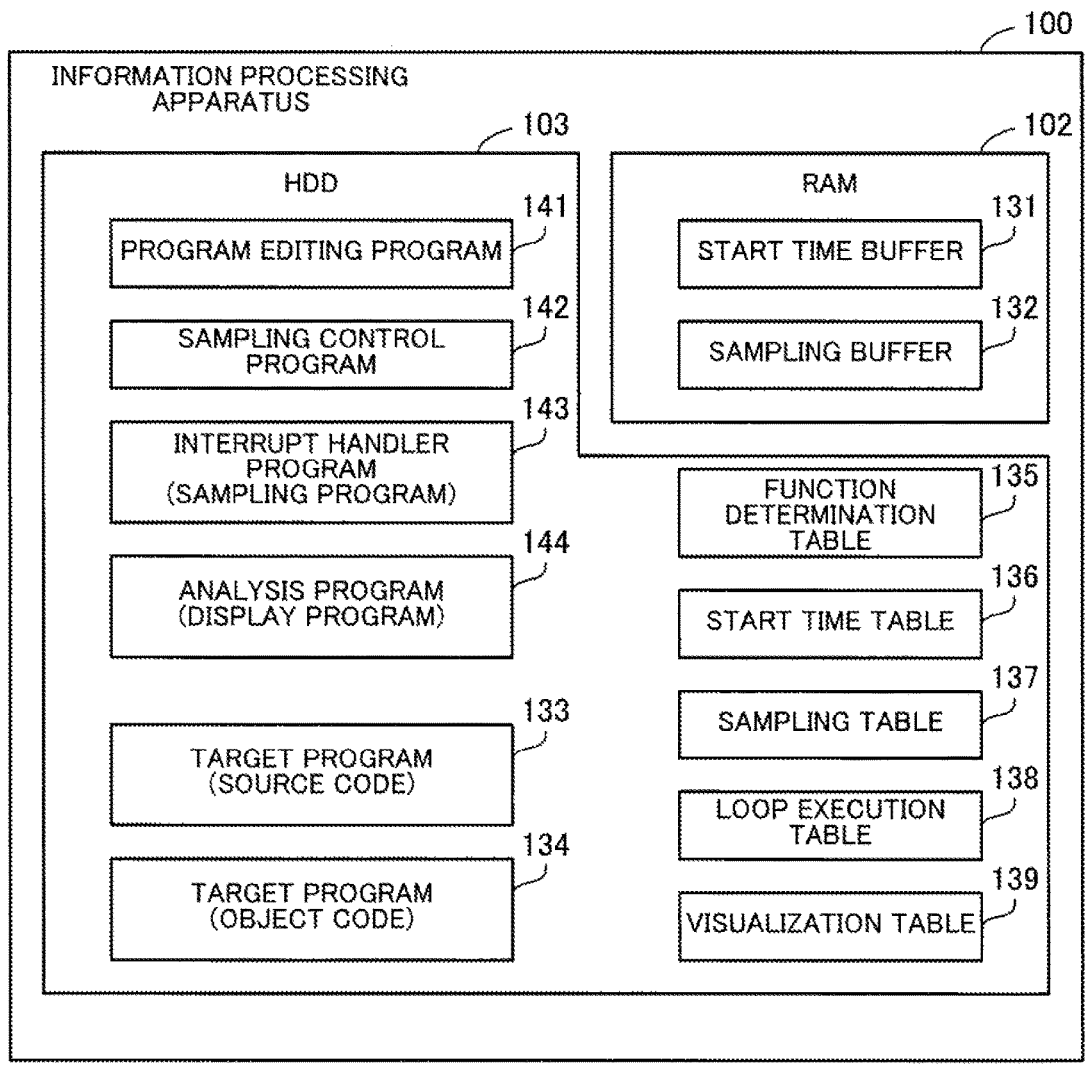
FIG. 7 is a block diagram illustrating an example of software of the information processing apparatus.

FIG. 7 is a block diagram illustrating an example of software of the information processing apparatus 100.

In the RAM 102 of the information processing apparatus 100, a start time buffer 131 and a sampling buffer 132 are reserved as buffer memory areas for temporarily storing information. The HDD 103 of the information processing apparatus 100 stores target programs 133 and 134, a function determination table 135, a start time table 136, a sampling table 137, a loop execution table 138, and a visualization table 139. The HDD 103 also stores a program editing program 141, a sampling control program 142, an interrupt handler program 143, and an analysis program 144. The programs and tables stored in the HDD 103 may be temporarily loaded into the RAM 102 when used.

The start time buffer 131 is a buffer memory area for temporarily storing the time stamp of the start time of the in-loop process during execution of the target program 134. The start time buffer 131 is reserved in the RAM 102 by the target program 134. The sampling buffer 132 is a buffer memory area for temporarily storing sampling records that are regularly obtained when the interrupt generation flag is ON. The sampling buffer 132 is reserved in the RAM 102 by the sampling control program 142.

The target program 133 is a program that is analyzed, and is source code written in a programing language. The target program 133 may be edited by the program editing program 141. The target program 134 is a program that is analyzed, and is machine-readable object code. The target program 134 is generated by, for example, compiling the target program 133.

The function determination table 135 stores the corresponding relationship between instruction addresses and functions. By referring to the function determination table 135, it is possible to determine which function contains an instruction having a certain instruction address. The function determination table 135 may be created by the user, or may be automatically created by the program editing program 141.

The start time table 136 stores start times. A start time is output by the target program 134 each time the in-loop process is repeated, and indicates the time when execution of the in-loop process is started. Information temporarily stored in the start time buffer 131 is transferred to the start time table 136. The sampling table 137 stores sampling records that are regularly obtained using an interrupt function of the CPU 101. Information temporarily stored in the sampling buffer 132 is transferred to the sampling table 137.

The loop execution table 138 stores the corresponding relationship between the time offset and functions. The loop execution table 138 is generated by the analysis program 144. The visualization table 139 stores visualization information used for displaying graphs such as the graphs 22 and 23 and the like as the analysis result. The visualization table 139 is generated by the analysis program 144.

The program editing program 141 is a program that edits the target program 133 or the target program 134 such that a start time is output upon execution of the target program 134. The program editing program 141 may include a compiler program that converts the target program 133 into the target program 134. The sampling control program 142 is a program that starts the edited target program 134, and controls the CPU 101 to perform sampling during execution of the target program 134.

The interrupt handler program 143 is a program that is called when the CPU 101 issues an interrupt. When the interrupt handler program 143 is called, execution of an application program such as the target program 134 is temporarily suspended, and the interrupt handler program 143 is preferentially executed. The interrupt handler program 143 may be included in the OS. The interrupt handler program 143 serves also as a sampling program that obtains sampling records.

The analysis program 144 is a program that analyzes sampling records after the target program 134 ends, and visualizes the execution status of the target program 134. The analysis program 144 serves also as a display program that displays information on the display 111.

The program editing program 141, the sampling control program 142, the interrupt handler program 143, and the analysis program 144 are executed by the CPU 101. The functions of these programs will be described in detail below. The functions of two or more of the program editing program 141, the sampling control program 142, the interrupt handler program 143, and the analysis program 144 may be integrated into a single program. For example, the sampling control program 142 and the analysis program 144 may be integrated into a single program. Further, the program editing program 141, the sampling control program 142, and the analysis program 144 may be integrated into a single program.

Figure 8:
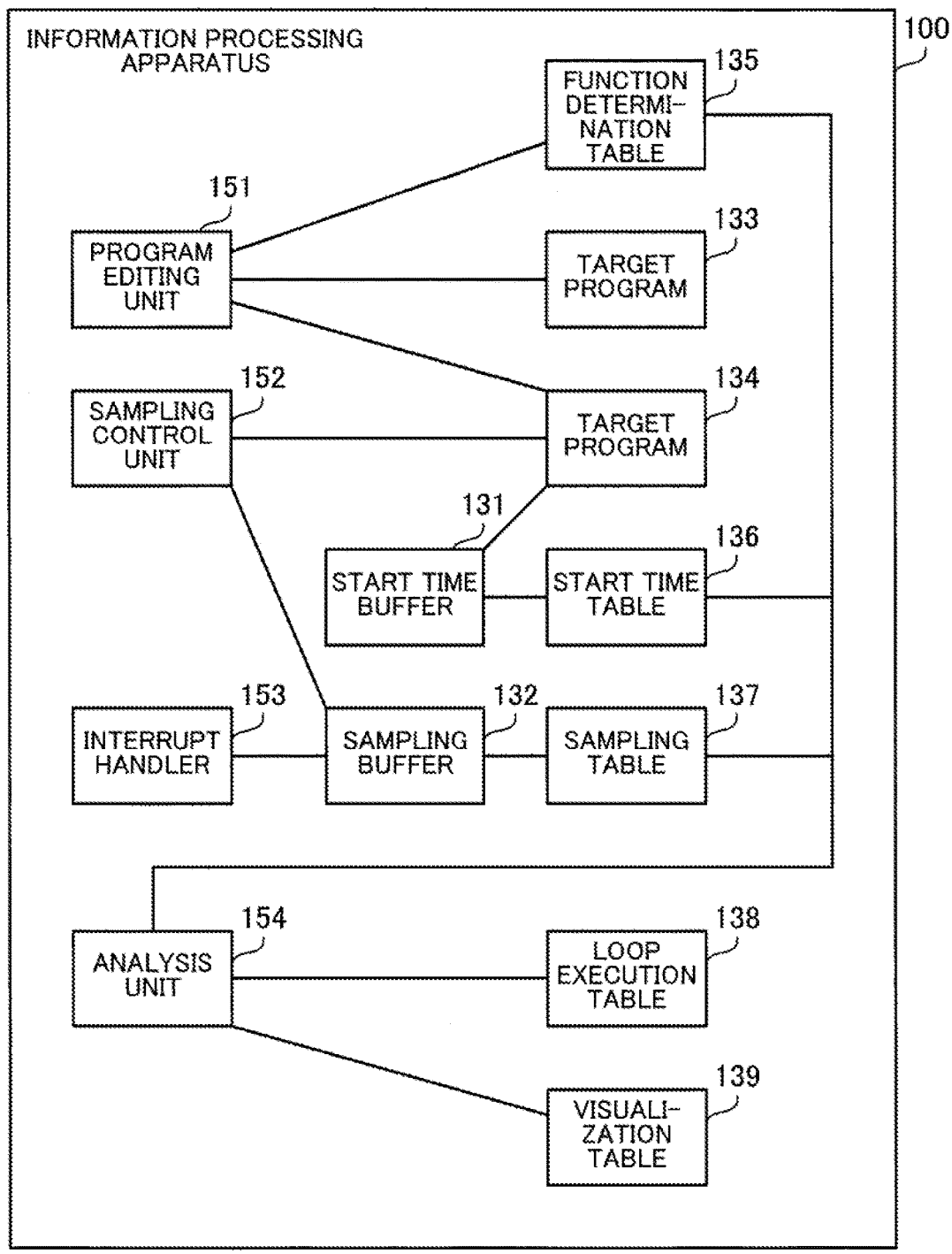
FIG. 8 is a block diagram illustrating an example of processes executed by the information processing apparatus.

FIG. 8 is a block diagram illustrating an example of processes executed by the information processing apparatus 100.

The information processing apparatus 100 includes a program editing unit 151, a sampling control unit 152, an interrupt handler 153, and an analysis unit 154.

The program editing unit 151 corresponds to a process that is generated by the program editing program 141 executed by the CPU 101. The sampling control unit 152 corresponds to a process that is generated by the sampling control program 142 executed by the CPU 101. The interrupt handler 153 corresponds to a process that is generated by the interrupt handler program 143 executed by the CPU 101. The analysis unit 154 corresponds to a process that is generated by the analysis program 144 executed by the CPU 101.

In the following, the operations performed by the information processing apparatus 100 may be described as being performed by the program editing unit 151, the sampling control unit 152, the interrupt handler 153, and the analysis unit 154. However, these operations may be considered as being performed by the CPU 101 that executes the program editing program 141, the sampling control program 142, the interrupt handler program 143, and the analysis program 144.

The program editing unit 151 edits the target program 133 or the target program 134 such that a start time is output each time the in-loop process is repeated.

For example, the program editing unit 151 displays the target program 133 in source code form on the display 111. Then, upon receiving an input for editing the source code from the user, the program editing unit 151 updates the target program 133 in accordance with the input. The program editing unit 151 may compile the target program 133 edited by the user, and thereby generate the target program 134 in object code form. If the edited target program 133 includes a specific definition statement, the program editing unit 151 may expand the special definition statement using a preprocessor function or the like. Alternatively, the program editing unit 151 may expand the special definition statement only when a predetermined debug option is selected upon compilation.

The program editing unit 151 analyzes the target program 133 in source code form, and automatically inserts a statement into the target program 133. For example, the program editing unit 151 detects a loop from the target program 133. The form of a statement representing a loop is dependent on the programing language used for describing the target program 133. The program editing unit 151 inserts a statement that reserves the start time buffer 131 in the RAM 102, before the detected loop. The program editing unit 151 inserts a statement that stores a time stamp (start time) of the time stamp register 122 at that time in the start time buffer 131 at the top of a set of statements contained in the detected loop. Further, the program editing unit 151 inserts a statement that outputs the time stamp stored in the start time buffer 131 to the start time table 136, after the detected loop. The program editing unit 151 may compile the automatically edited target program 133 to generate the target program 134.

Alternatively, the program editing unit 151 may analyze the target program 134 in object code form, and automatically insert a statement into the target program 134.

Further, the program editing unit 151 generates the function determination table 135. For example, the program editing unit 151 generates the function determination table 135 in accordance with an input from the user. The user specifies a function name for a range of instruction addresses, for example. Alternatively, the program editing unit 151 may analyze the target program 134, and automatically generates the function determination table 135. For example, the program editing unit 151 detects a function from the target program 134 in object code form, and registers the name of the detected function and the address range of an instruction set contained in the function in the function determination table 135.

The sampling control unit 152 starts the target program 134 edited by the program editing unit 151, and performs control such that sampling is performed during execution of the target program 134. The sampling control unit 152 reserves the sampling buffer 132 in the RAM 102, before starting the target program 134. Further, the sampling control unit 152 writes an initial value corresponding to the sampling interval to the count-up register 124, and sets the interrupt generation flag of the interrupt control register 123 to ON. After the target program 134 ends, the sampling control unit 152 sets the interrupt generation flag of the interrupt control register 123 to OFF. Further, the sampling control unit 152 outputs a sampling record stored in the sampling buffer 132 to the sampling table 137.

The interrupt handler 153 is an event handler that is executed each time the interrupt issuing unit 125 issues an interrupt. The interrupt handler 153 reads an instruction address from the instruction address register 121, and reads a time stamp from the time stamp register 122. Further, the interrupt handler 153 obtains identification information (process ID) of a process having been executed immediately before the interrupt, from the OS running on the information processing apparatus 100. The interrupt handler 153 stores a sampling record including the instruction address, the time stamp, and the process ID in the sampling buffer 132.

The analysis unit 154 analyzes collected sampling records after the target program 134 ends. The analysis unit 154 reads the sampling records from the sampling table 137, and converts the sampling time of each sampling record into a time offset, based on the time stamp registered in the start time table 136. Further, the analysis unit 154 converts the instruction address of the target program 134 contained in each sampling record into a function name, based on the function name and the address range registered in the function determination table 135. The analysis unit 154 registers the time offset and the function name in the loop execution table 138.

The analysis unit 154 sorts the function names registered in the loop execution table 138 in ascending order of time offset. The analysis unit 154 divides the time offset into a plurality of offset segments, specifies functions detected in each offset segment, and calculates the detection rates of the functions by counting the function names. The analysis unit 154 registers visualization information including the offset segments and the detection rates of the functions in the visualization table 139. Then, based on the visualization information registered in the visualization table 139, the analysis unit 154 generates a stacked bar chart like the graphs 22 and 23, and displays the stacked bar chart on the display 111.

FIG. 9 illustrates an example of editing a target program.

For ease of understanding, it is assumed here that the target program 133 in source code form is edited. The target program 133 is compiled to generate the target program 134 that outputs a start time. The insertion of statements illustrated in FIG. 9 may be performed in accordance with an input from the user or may be automatically performed by the program editing unit 151.

In the example of FIG. 9, the target program 133 includes functions a, b, c, and d. The term "function" as used herein includes units of processing referred to by other names such as "method", "procedure", and so on. The functions a, b, c, and d are sequentially called in the loop. Although a for statement is used for expressing the loop in FIG. 9, other control statements such as a while statement and so on may be used for expressing the loop.

The edited target program 133 contains a statement that defines the start time buffer 131, and a statement that stores its process ID in the start time buffer 131, before the loop. Further, the edited target program 133 contains a statement that stores a time stamp in the start time buffer 131, at the top of the loop, that is, before a function call statement that calls the function a. In FIG. 9, rdtsc( ) as an application programing interface (API) is used to refer to the value of the time stamp register 122. The statement at the top of the loop is executed each time the in-loop process is repeated. In the example of FIG. 9, the statement that stores the time stamp in the start time buffer 131 is executed 16 times.

Further, the edited target program 133 contains a statement that outputs data stored in the start time buffer 131 to a file, after the loop. These additional statements are the statements that are inserted into the target program 133 by the user or the program editing unit 151, and the statements that are not contained in the original target program 133.

FIG. 10 illustrates an example of the sampling table 137.

The sampling table 137 includes the following items: process ID, time stamp, and instruction address. The item "process ID" indicates identification information of a process having been executed immediately before an interrupt. In the second embodiment, the process ID is basically the process ID of a process started by the target program 134. The item "time stamp" indicates a time stamp of a sampling time. The item "instruction address" indicates the instruction address of the instruction having been executed immediately before an interrupt.

FIG. 11 illustrates an example of the start time table 136.

The start time table 136 contains a process ID and a plurality of time stamps. The process ID of the start time table 136 indicates identification information of a process that has output the time stamps of the start time table 136, that is, identification information of a process started by the target program 134. Each of the time stamps in the start time table 136 indicates a start time of the in-loop process that is output by the target program 134.

FIG. 12 illustrates an example of the function determination table 135.

The function determination table 135 includes the following items: program ID, function name, and address range. The item "program ID" indicates identification information of the target program 134. The program ID may be the same as or may be different from the process ID. In the latter case, a program ID and a process ID may be associated with each other by obtaining the corresponding relationship between program IDs and process IDs from the OS running on the information processing apparatus 100, for example.

The item "function name" indicates the name of a function contained in the target program 134. The function name may be automatically extracted by analyzing the target program 133 or the target program 134. The item "address range" indicates the range of instruction addresses of an instruction set contained in the function, that is, the instruction address of the top of the function and the instruction address of the end of the function. The instruction address is an address in the target program 134 in object code form.

FIG. 13 illustrates an example of the loop execution table 138.

The loop execution table 138 stores records corresponding to records (sampling records) of the sampling table 137. The loop execution table 138 includes the following items: process ID, time offset, and function name. The item "process ID" indicates the same process ID as that in the sampling table 137. The item "time offset" indicates a time offset converted from the time stamp of the corresponding sampling record. The item "function name" indicates the name of the function to which the instruction address of the corresponding sampling record belongs.

That is, each time stamp in the sampling table 137 is converted into a time offset, based on the start time table 136. If the sampling table 137 contains sampling records of a plurality of processes, the analysis unit 154 may extract sampling records of the desired process from the sampling table 137. The records in the sampling table 137 and the records in the start time table 136 may be associated with each other based on the process IDs. If there are a plurality of start time tables corresponding to a plurality of target programs, the analysis unit 154 may select the start time table corresponding to the desired process from the plurality of start time tables, based on the process ID.

Further, each instruction address in the sampling table 137 is converted into a function name, based on the function determination table 135. The records in the sampling table 137 and the records in the function determination table 135 may be associated with each other based on the process IDs and the program IDs. If there are a plurality of function determination tables corresponding to a plurality of target programs, the analysis unit 154 may select the function determination table corresponding to the desired target program among the plurality of function determination tables, based on the program ID. Note that the plurality of records contained in the loop execution table 138 are sorted in ascending order of time offset.

FIG. 14 illustrates an example of the visualization table 139.

The visualization table 139 includes the following items: process ID, offset segment, and function rate. The item "process ID" indicates the process ID of a process started by the target program 134. The item "offset segment" indicates the range of time offset, that is, the time offset at the beginning and the time offset at the end of an offset segment. In the example of FIG. 14, the time offset greater than or equal to 0 and less than 10 is divided into five offset segments: greater than or equal to 0 and less than 2; greater than or equal to 2 and less than 4; greater than or equal to 4 and less than 6; greater than or equal to 6 and less than 8; and greater than or equal to 8 and less than 10. The item "function rate" indicates the name of the function whose execution is detected and the detection rate of that function. The function rate may be calculated by counting the function names in the loop execution table 138. Note that the plurality of records contained in the visualization table 139 are sorted in ascending order of offset segment.

The following describes a processing procedure performed by the information processing apparatus 100.

Figure 15:
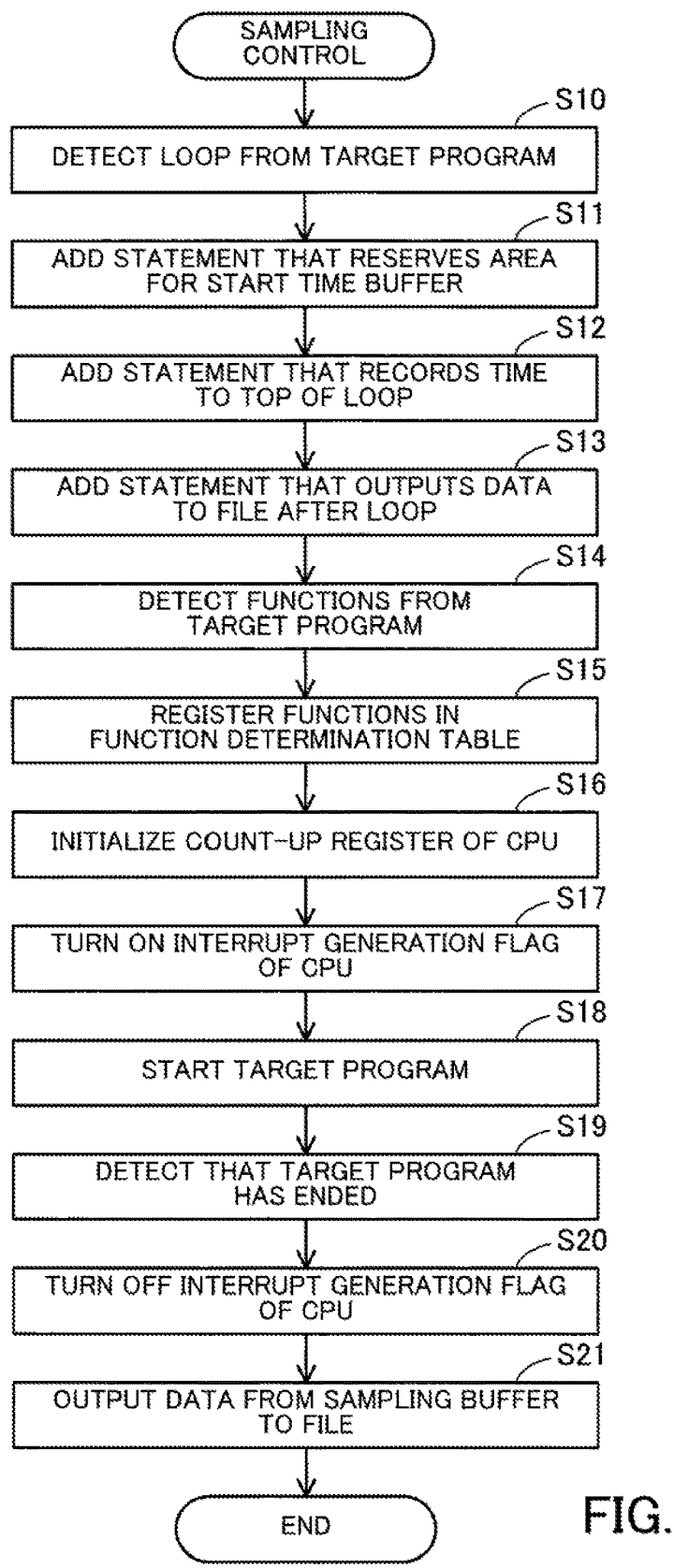
FIG. 15 is a flowchart illustrating an example of the procedure of sampling control.

FIG. 15 is a flowchart illustrating an example of the procedure of sampling control.

Sampling control is implemented by executing the program editing program 141 and the sampling control program 142.

(S10) It is assumed here that the program editing unit 151 edits the target program 133 in source code format. The program editing unit 151 analyzes the target program 133, and detects a loop contained in the target program 133. The loop is written in the target program 133, using a for statement, a while statement, or the like. Note that the user may select a loop to be analyzed from the target program 133.

(S11) The program editing unit 151 inserts a statement that defines the start time buffer 131 (a statement that reserves an area), before the loop detected in step S10. For example, a variable indicating the start time buffer 131 is declared. The program editing unit 151 also inserts a statement that adds a process ID to the start time buffer 131, before the detected loop. Note that the user may manually insert the statements before the loop.

(S12) The program editing unit 151 inserts a statement that adds the time stamp of the time stamp register 122 to the start time buffer 131 (a statement that records time), at the top of the loop detected in step S10. The statement at the top of the loop is the first statement that is executed each time the in-loop process is repeated. Note that the user may manually insert the statement that records a start time.

(S13) The program editing unit 151 inserts a statement that writes data stored in the start time buffer 131 to a file in the HDD 103 (a statement that outputs data to a file), after the loop detected in step S10. The file to which the data is output is the start time table 136. Note that the user may manually insert the statement that outputs data to a file.

The program editing unit 151 compiles the target program 133 that is edited as described above, and thereby generates the target program 134.

(S14) The program editing unit 151 analyzes the target program 134, and detects a plurality of functions contained in the target program 134. Note that the user may select functions to be analyzed from the target program 134.

(S15) The program editing unit 151 calculates, for each of the plurality of functions detected in step S14, the address range indicating the position where that function is located in the target program 134. The program editing unit 151 registers the program ID of the target program 134, the function name, and the address range in the function determination table 135. Note that the function name may be extracted by referring to the target program 133 in source code form. Further, the user may manually associate the function name and the address range with each other.

When the target program 134 and the function determination table 135 are prepared in the manner described above, collection of sampling records may be started. At this point, the user may input a command that starts the sampling control unit 152 to the information processing apparatus 100.

(S16) The sampling control unit 152 initializes the count-up register 124 of the CPU 101. That is, the sampling control unit 152 writes the initial value to the count-up register 124. The initial value is determined in advance in consideration of the architecture and the operating clock frequency of the CPU 101, the desired sampling interval, and so on. The smaller the initial value is, the longer the time taken by the count-up register 124 to overflow is, and the greater the sampling interval is. The greater the initial value is, the shorter the time taken by the count-up register 124 to overflow is, and the smaller the sampling interval is.

(S17) The sampling control unit 152 reserves the sampling buffer 132 in the RAM 102. Further, the sampling control unit 152 sets the interrupt generation flag stored in the interrupt control register 123 of the CPU 101 to ON (for example, "1"). In response, the interrupt issuing unit 125 regularly issues an interrupt.

(S18) The sampling control unit 152 causes the CPU 101 to start the target program 134 edited in steps S11 to S13.

(S19) The sampling control unit 152 detects that the target program 134 has ended. The sampling control unit 152 may detect that the target program 134 has ended when the process generated by the target program 134 dies.

(S20) The sampling control unit 152 sets the interrupt generation flag stored in the interrupt control register 123 of the CPU 101 to OFF (for example, "0"). In response, the interrupt issuing unit 125 stops issuing an interrupt.

(S21) The sampling control unit 152 writes the data stored in the sampling buffer 132 in steps S17 to S20 to a file on the HDD 103. The file to which the data is output is the sampling table 137.

Figure 16:
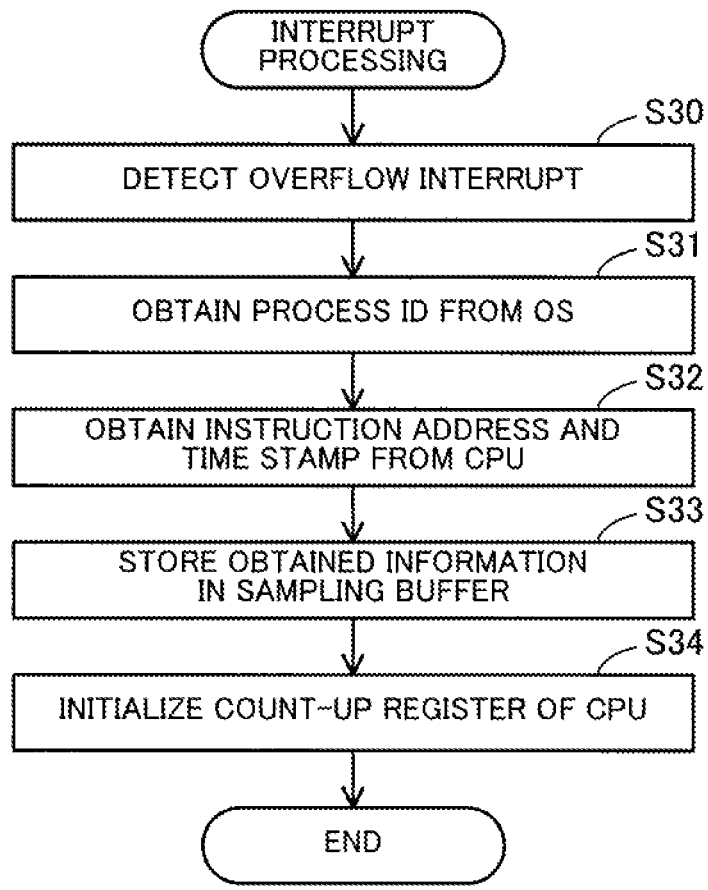
FIG. 16 is a flowchart illustrating an example of the procedure of interrupt processing.

FIG. 16 is a flowchart illustrating an example of the procedure of interrupt processing.

Each time the interrupt issuing unit 125 issues an interrupt, the processing of FIG. 16 is executed. The interrupt processing is implemented by executing the interrupt handler program 143.

(S30) The interrupt handler 153 detects an interrupt generated in response to an overflow of the count-up register 124.

(S31) The interrupt handler 153 obtains the process ID of a process having been executed immediately before the interrupt, from the OS running on the information processing apparatus 100.

(S32) The interrupt handler 153 obtains the instruction address from the instruction address register 121 of the CPU 101. The interrupt handler 153 also obtains the time stamp from the time stamp register 122 of the CPU 101.

(S33) The interrupt handler 153 adds a sampling record including the obtained process ID, instruction address, and time stamp to the sampling buffer 132.

(S34) The interrupt handler 153 initializes the count-up register 124 of the CPU 101. That is, the interrupt handler 153 writes the initial value to the count-up register 124. The initial value to be written may be the same as that of step S16.

Figure 17:
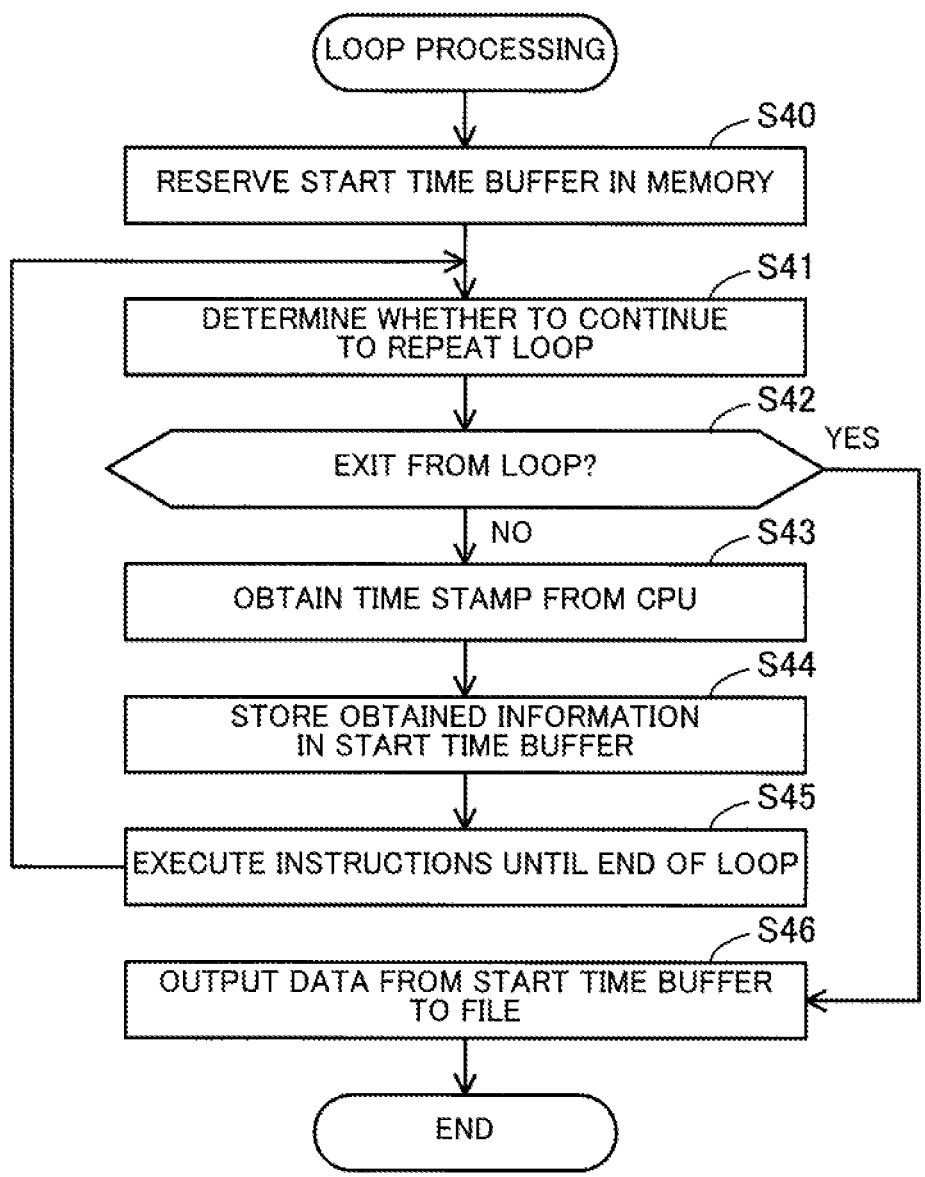
FIG. 17 is a flowchart illustrating an example of the procedure of loop processing.

FIG. 17 is a flowchart illustrating an example of the procedure of loop processing.

The processing of FIG. 17 is executed when the CPU 101 starts the target program 134. The loop processing is implemented by executing the target program 134.

(S40) The instruction execution unit 126 reserves the start time buffer 131 in the RAM 102, in accordance with the target program 134. Further, the instruction execution unit 126 obtains its process ID, and adds the process ID to the start time buffer 131, in accordance with the target program 134.

(S41) The instruction execution unit 126 determines whether to continue to repeat the in-loop process, in accordance with the target program 134. For example, the instruction execution unit 126 determines whether a determination condition, such as that the value of the loop variable is less than a threshold value, is satisfied. If the determination condition is satisfied, the instruction execution unit 126 determines to continue to repeat the in-loop process. If the determination condition is not satisfied, the instruction execution unit 126 determines not to continue to repeat the in-loop process.

(S42) The instruction execution unit 126 determines whether in step S41 a determination is made not to continue to repeat the in-loop process (a determination is made to exit from the loop). If a determination is made to exit from the loop, the processing proceeds to step S46.

If a determination is made not to exit from the loop, the processing proceeds to step S43.

(S43) The instruction execution unit 126 obtains a time stamp from the time stamp register 122 of the CPU 101, in accordance with the target program 134.

(S44) The instruction execution unit 126 adds the time stamp obtained in step S43 to the start time buffer 131, in accordance with the target program 134.

(S45) The instruction execution unit 126 executes instructions following the instruction executed in step S44 until the end of the loop, in accordance with the target program 134. Then, the processing returns to step S41.

(S46) The instruction execution unit 126 writes the data stored in the start time buffer 131 to a file on the HDD 103, in accordance with the target program 134. The file to which the data is output is the start time table 136.

Figure 18:
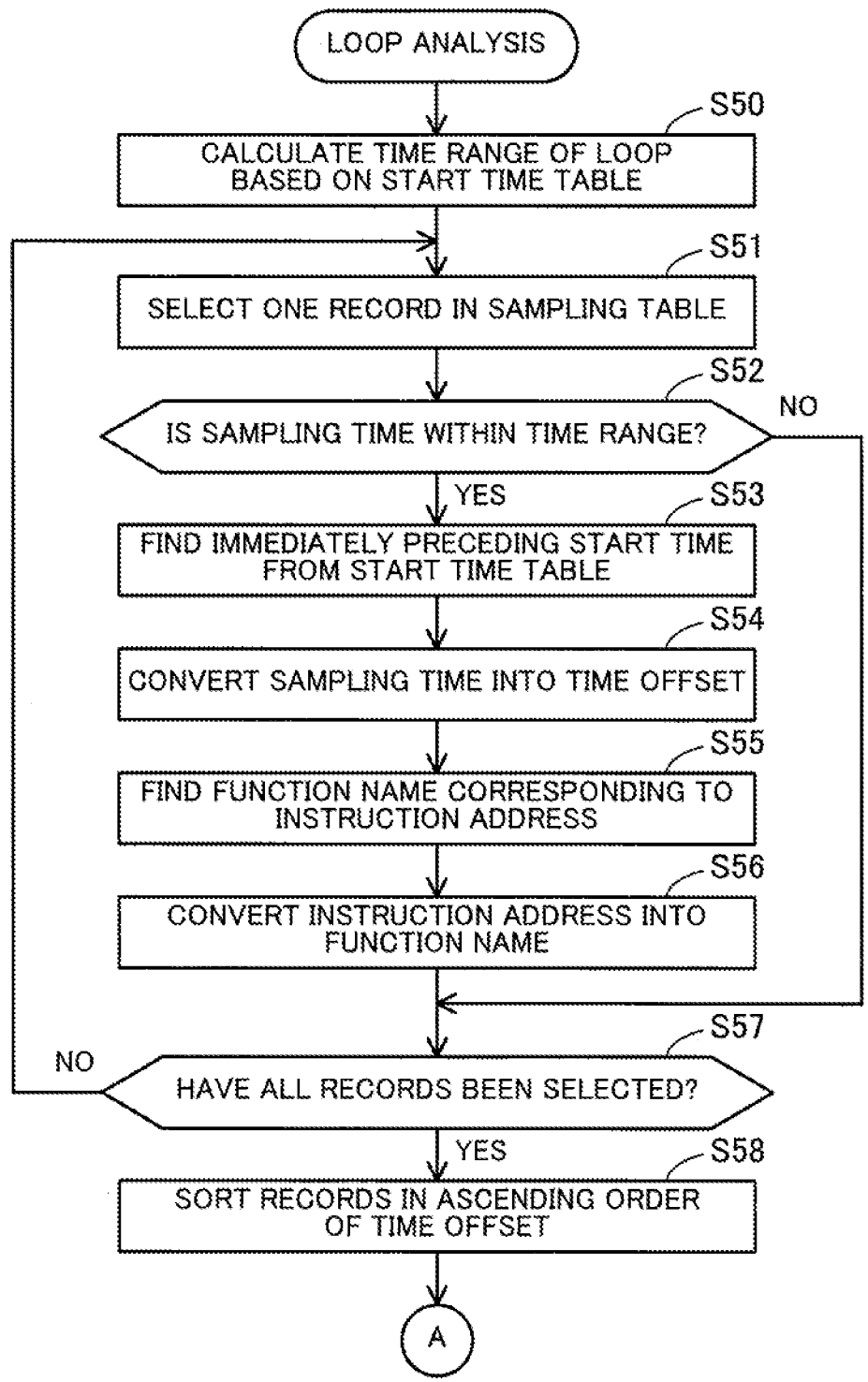
FIGS. 18 and 19 are flowcharts illustrating an example of the procedure of loop analysis.

FIG. 18 is a flowchart illustrating an example of the procedure of loop analysis.

After the sampling control of FIG. 15 is completed, the processing of FIG. 18 is performed. The loop analysis is implemented by executing the analysis program 144.

(S50) The analysis unit 154 calculates a time range in which the loop under analysis was executed, based on the time stamps contained in the start time table 136. For example, the analysis unit 154 determines the smallest time stamp among the time stamps contained in the start time table 136 as the beginning of the time range, and the largest time stamp as the end of the time range.

(S51) The analysis unit 154 selects one record (sampling record) contained in the sampling table 137. Note that if the process ID contained in a certain sampling record is not the process ID of the desired process (the process related to the target program 134), the analysis unit 154 may ignore the sampling record.

(S52) The analysis unit 154 determines whether the time stamp (sampling time) of the record selected in step S51 is within the time range calculated in step S50. If the sampling time is within the time range, the processing proceeds to step S53. If the sampling time is not within the time range, the processing proceeds to step S57.

(S53) The analysis unit 154 finds the start time immediately preceding the sampling time, from the start time table 136. That is, the analysis unit 154 finds the largest time stamp among the time stamps smaller than the sampling time, from the start time table 136. If there are a plurality of start time tables corresponding to a plurality of target programs, the analysis unit 154 may ignore start time tables other than the start time table corresponding to the desired process.

(S54) The analysis unit 154 converts the sampling time into a time offset, based on the start time found in step S53. That is, the analysis unit 154 sets a value obtained by subtracting the start time from the sampling time (a value greater than or equal to 0 indicating the difference between the start time and the sampling time) as a time offset.

(S55) The analysis unit 154 finds an address range to which the instruction address of the sampling record selected in step S51 belongs, from the function determination table 135, and obtains the function name corresponding to the found address range. Note that the analysis unit 154 may ignore records in the function determination table 135 that have program IDs different from the program ID of the target program 134.

(S56) The analysis unit 154 converts the instruction address of the sampling record into a function name. The analysis unit 154 registers a record including the process ID, the time offset, and the function name corresponding to the target program 134 in the loop execution table 138.

(S57) The analysis unit 154 determines whether all the sampling records contained in the sampling table 137 have been selected in step S51. If all the sampling records have been selected, the processing proceeds to step S58. Otherwise, the processing returns to step S51.

(S58) The analysis unit 154 sorts the records contained in the loop execution table 138 in ascending order of time offset.

Note that the analysis unit 154 may filter out records that are not needed from the function determination table 135, the start time table 136, and the sampling table 137, based on the process IDs and program IDs. Thus, even when the CPU 101 executes a plurality of processes in parallel, it is possible to analyze only the loop of interest.

Figure 19:
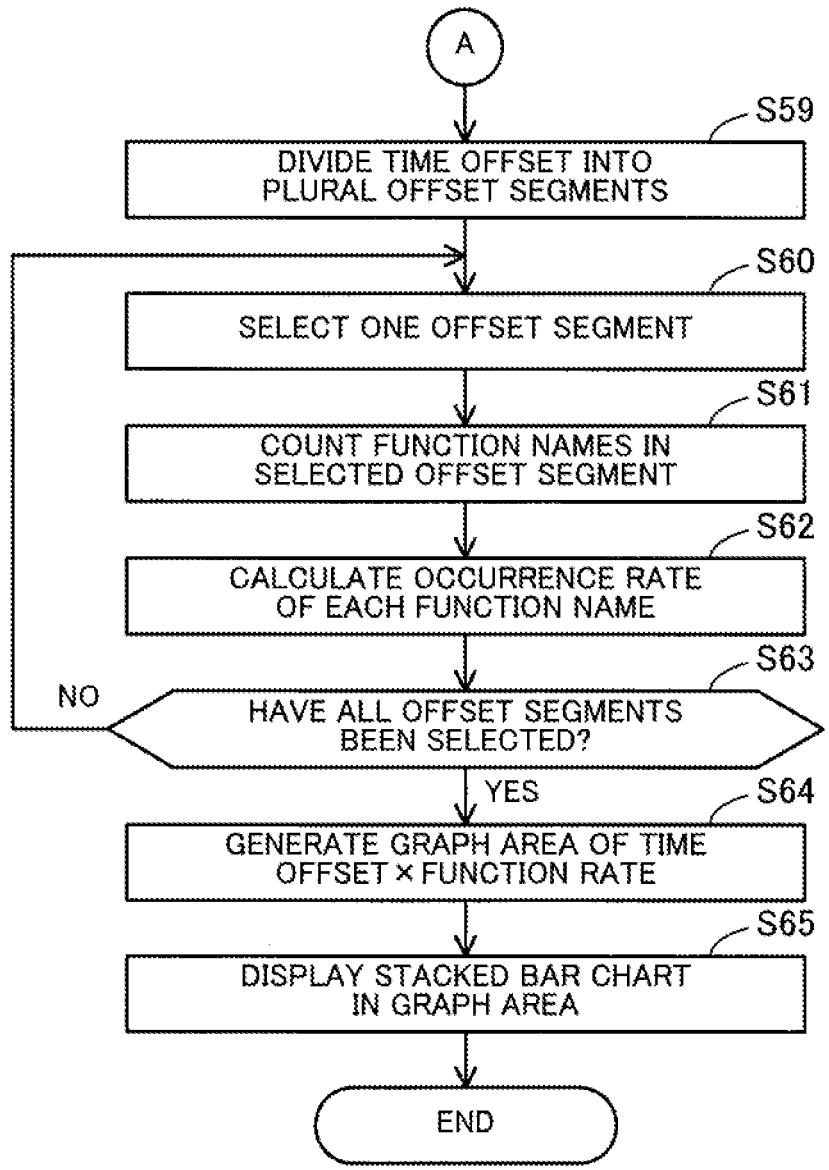

FIG. 19 is a flowchart (continued from FIG. 18) illustrating the example of the procedure of loop analysis.

(S59) The analysis unit 154 divides the time offset into a plurality of offset segments. The sampling interval and the width of the offset segment are determined in advance. For example, the sampling interval is set to 50 milliseconds, and the width of the offset segment is set to 1 millisecond.

(S60) The analysis unit 154 selects one offset segment.

(S61) The analysis unit 154 finds a record having a time offset that is in the offset segment selected in step S60, from the loop execution table 138. The analysis unit 154 counts the number of occurrences of each function name in the found record.

(S62) The analysis unit 154 calculates the occurrence rate of each function name, based on the number of occurrences counted in step S61. For example, the analysis unit 154 divides the number of occurrences of each function name by the total number of records belonging to the offset segment. The analysis unit 154 registers a record including the process ID, the offset segment, and the occurrence rate of each function corresponding to the target program 134 in the visualization table 139.

(S63) The analysis unit 154 determines whether all the offset segments have been selected in step S60. If all the offset segments have been selected, the processing proceeds to step S64. If there are unselected offset segments, the processing returns to step S60.

(S64) The analysis unit 154 generates a graph area in which the horizontal axis represents the offset segments of the visualization table 139 and the vertical axis represents the function rate of the visualization table 139. The plurality of offset segments arranged on the horizontal axis are sorted in ascending order of time offset. For example, the leftmost offset segment on the horizontal axis is an offset segment containing the time offset=0, and corresponds to the execution status near the top of the loop. Further, for example, the rightmost offset segment on the horizontal axis corresponds to the execution status near the end of the loop.

(S65) The analysis unit 154 generates a stacked bar chart representing the occurrence rate of each function name in each offset segment, in the graph area generated in step S64. The analysis unit 154 displays the stacked bar chart on the display 111. In the stacked bar chart, the total bar height represents 100%, and the bar height is allocated to the functions in accordance with the execution rates of the functions, for example. Thus, it is easy to determine how the function with the highest execution rate has changed over time as execution proceeds from the top of the loop to the end of the loop.

According to the information processing apparatus 100 of the second embodiment, the target program 134 is generated such that the start time is output each time the in-loop process is repeated, and then the target program 134 is generated. During execution of the target program 134, sampling records are collected at regular intervals using the interrupt function of the CPU 101. The sampling time is converted into a time offset based on the start time, and the function being executed is determined based on the instruction address contained in the sampling record. Then, the corresponding relationship between the time offset and the function being executed is displayed.

In this manner, it is possible to appropriately represent the time-series properties, such as the order in which the functions are called in the loop, compared to the case where the function names are simply listed in order of sampling time. Further, by sorting the sampling records not in order of sampling time but in order of time offset, it is possible to display the analysis result equivalent to that displayed in the case where the execution status of a single in-loop process is sampled at short intervals. Accordingly, even if the sampling interval is long, it is easy to analyze the in-loop process. Further, it is possible to save the computational resources such as the capacity of the CPU 101 and the capacity of the RAM 102 by increasing the length of the sampling interval. Furthermore, the behavior of the target program 134 is less affected by the sampling, so that the accuracy in analyzing the behavior of the target program 134 is improved.

According to one aspect, it is easy to analyze loop processing using intermittent sampling logs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store start time information and a plurality of sampling logs, the start time information indicating a plurality of start times that are calculated when a target program is executed, the target program including a loop that repeats a process using a plurality of functions, the plurality of functions being program modules included in the target program, each of the start times indicating a time when execution of the process is started on each repetition of the process, the plurality of sampling logs being generated by intermittent sampling when the target program is executed, each of the sampling logs including a sampling time and status information used for specifying a function being executed from among the plurality of functions; and
a processor configured to perform a procedure including:
converting the sampling time of each of the plurality of sampling logs into a time difference from the start time immediately preceding the sampling time, among the plurality of start times,
classifying the plurality of sampling logs into a plurality of time difference segments based on the time difference, and counting, for each of the time difference segments, a number of times execution of each of the plurality of functions is detected, based on the status information of the sampling log belonging to said each time difference segment, and
displaying time-series information indicating a corresponding relationship between the plurality of time difference segments that are arranged in order of time difference and the functions that are executed, based on the counted number of times.

2. The information processing apparatus according to claim 1, wherein the displaying includes calculating, for each of the plurality of time difference segments, execution rates of the plurality of functions, and displaying changes in the execution rates over time as the time-series information.

3. The information processing apparatus according to claim 1, wherein the procedure further includes generating the start time information, by starting the target program with an instruction inserted therein for outputting the start time of the process each time the process is repeated.

4. The information processing apparatus according to claim 1, wherein the procedure further includes generating the plurality of sampling logs, by starting the target program and performing the intermittent sampling during execution of the target program.

5. A execution status display method that is executed by a processor of a computer, the execution status display method comprising:
obtaining, by the processor, start time information indicating a plurality of start times that are calculated when a target program is executed, the target program including a loop that repeats a process using a plurality of functions, the plurality of functions being program modules included in the target program, each of the start times indicating a time when execution of the process is started on each repetition of the process;
obtaining, by the processor, a plurality of sampling logs that are generated by intermittent sampling when the target program is executed, each of the sampling logs including a sampling time and status information used for specifying a function being executed from among the plurality of functions;
converting, by the processor, the sampling time of each of the plurality of sampling logs into a time difference from the start time immediately preceding the sampling time, among the plurality of start times;
classifying, by the processor, the plurality of sampling logs into a plurality of time difference segments based on the time difference, and counting, for each of the time difference segments, a number of times execution of each of the plurality of functions is detected, based on the status information of the sampling log belonging to said each time difference segment; and
displaying, by the processor, time-series information indicating a corresponding relationship between the plurality of time difference segments that are arranged in order of time difference and the functions that are executed, based on the counted number of times.

6. A non-transitory computer-readable storage medium storing a computer program that causes a computer to perform a procedure comprising:
obtaining start time information indicating a plurality of start times that are calculated when a target program is executed, the target program including a loop that repeats a process using a plurality of functions, the plurality of functions being program modules included in the target program, each of the start times indicating a time when execution of the process is started on each repetition of the process;

obtaining a plurality of sampling logs that are generated by intermittent sampling when the target program is executed, each of the sampling logs including a sampling time and status information used for specifying a function being executed from among the plurality of functions;

converting the sampling time of each of the plurality of sampling logs into a time difference from the start time immediately preceding the sampling time, among the plurality of start times;

classifying the plurality of sampling logs into a plurality of time difference segments based on the time difference, and counting, for each of the time difference segments, a number of times execution of each of the plurality of functions is detected, based on the status information of the sampling log belonging to said each time difference segment; and displaying time-series information indicating a corresponding relationship between the plurality of time difference segments that are arranged in order of time difference and the functions that are executed, based on the counted number of times.

* * * * *